United States Patent [19]

Rougeolle

[11] 4,437,071
[45] Mar. 13, 1984

[54] DEVICE FOR THE RECOVERY OF A CLOCK SIGNAL FROM A BINARY SIGNAL

[75] Inventor: Daniel Rougeolle, Paris, France
[73] Assignee: Thomson-CSF, Paris, France
[21] Appl. No.: 328,260
[22] Filed: Dec. 7, 1981
[30] Foreign Application Priority Data
  Dec. 9, 1980 [FR] France .................. 80 26075
[51] Int. Cl.³ .................. H03L 7/08
[52] U.S. Cl. .................. 331/1 A; 331/11; 331/14
[58] Field of Search .................. 331/1 A, 11, 14
[56] References Cited
  U.S. PATENT DOCUMENTS
  3,370,249  2/1968  Martin .................. 331/11
  3,458,823  7/1969  Nordahl .................. 331/1 A
  3,611,175 10/1971  Boelke .................. 331/11
  4,069,462  1/1978  Dunn .................. 331/11

Primary Examiner—John S. Heyman
Attorney, Agent, or Firm—Oblon, Fisher, Spivak, McClelland & Maier

[57] ABSTRACT

The device for controlling a local clock signal H both in frequency and in phase by means of a binary signal S comprises logical means for delivering two signals $S_1$ and $S_3$ representing respectively the sign of the phase difference and the sign of the frequency difference between the signals H and S. The signal H is generated by a voltage-controlled oscillator circuit, the control voltage of which is generated by a tuning control circuit as a function of the signal $S_1$ when the frequency of the signal H is close in value to the desired frequency and as a function of the signal $S_3$ when this is not the case.

7 Claims, 11 Drawing Figures

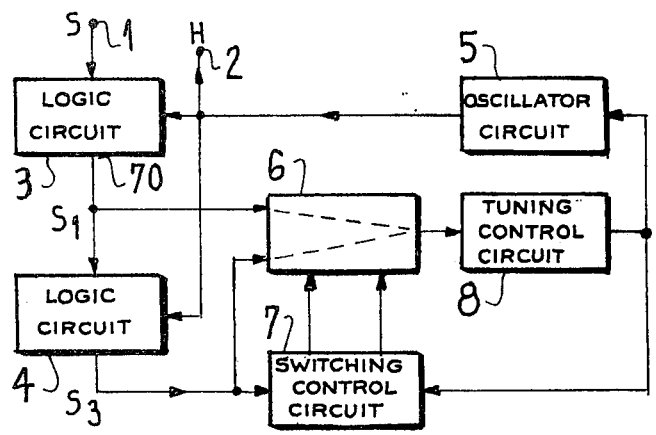
FIG_1
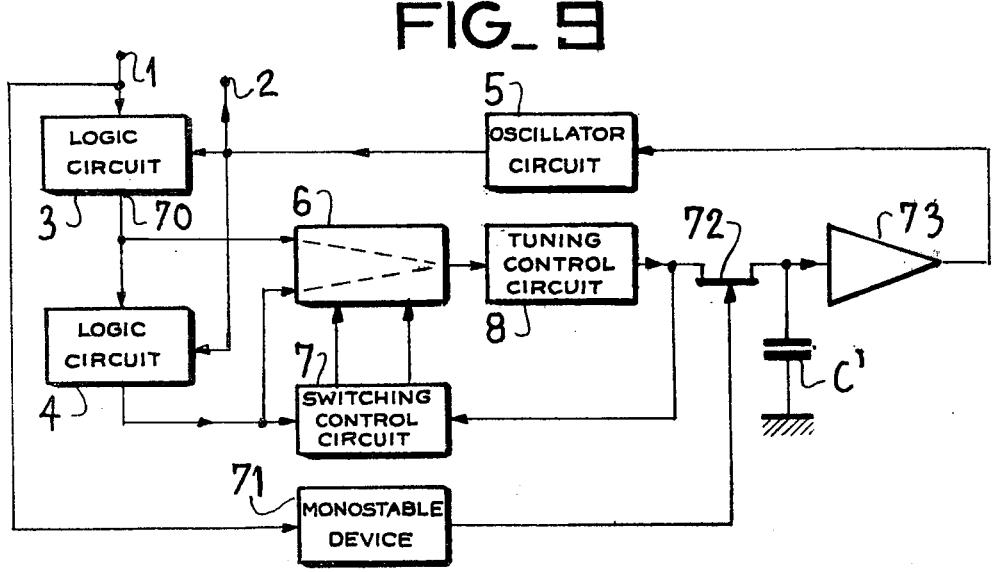
FIG_9
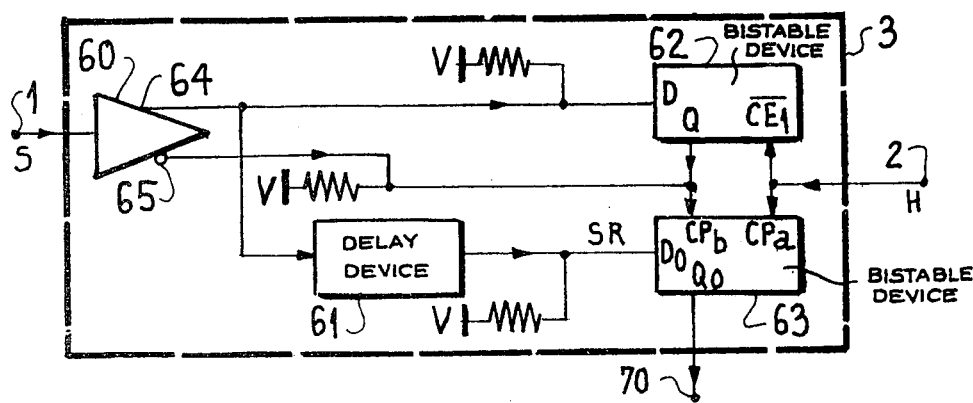
FIG_10

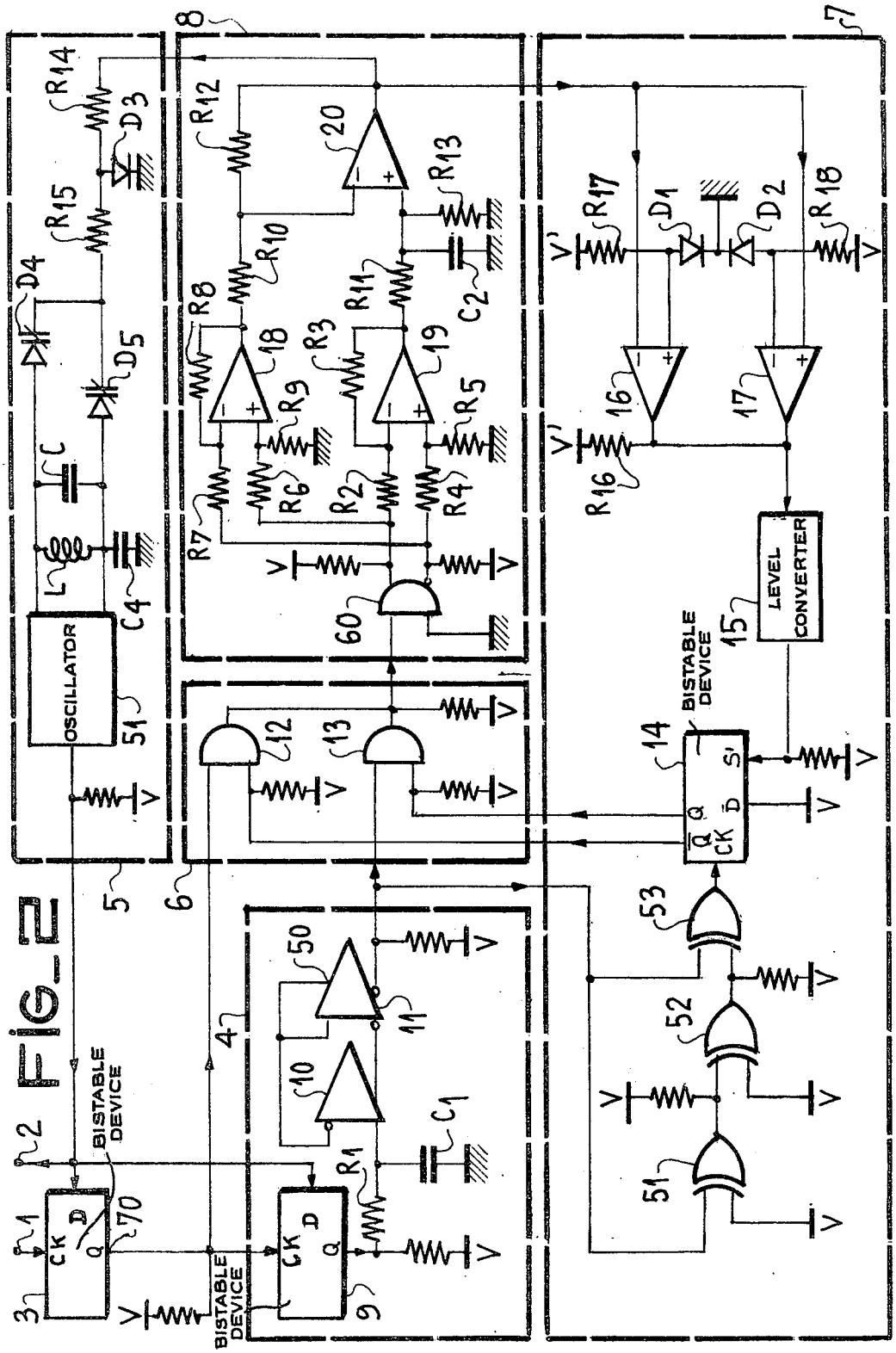

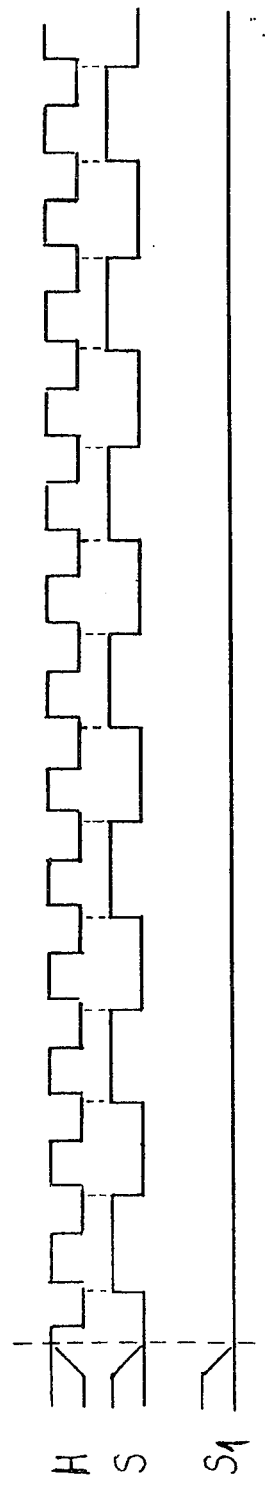
FIG_3
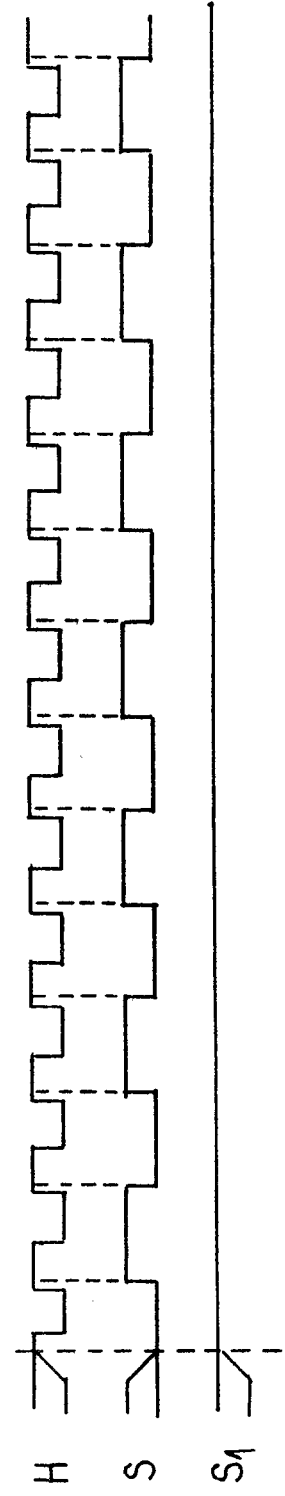
FIG_4

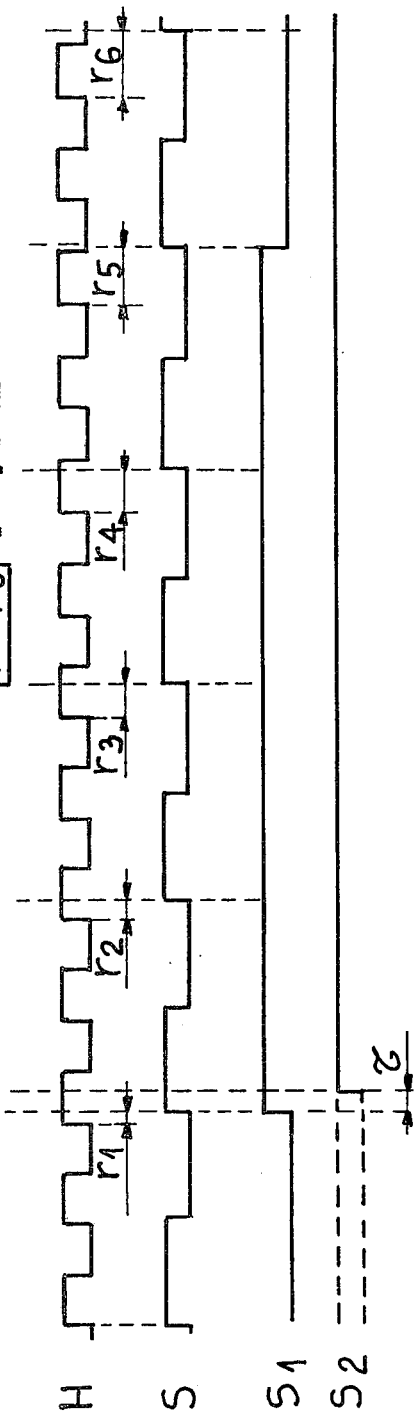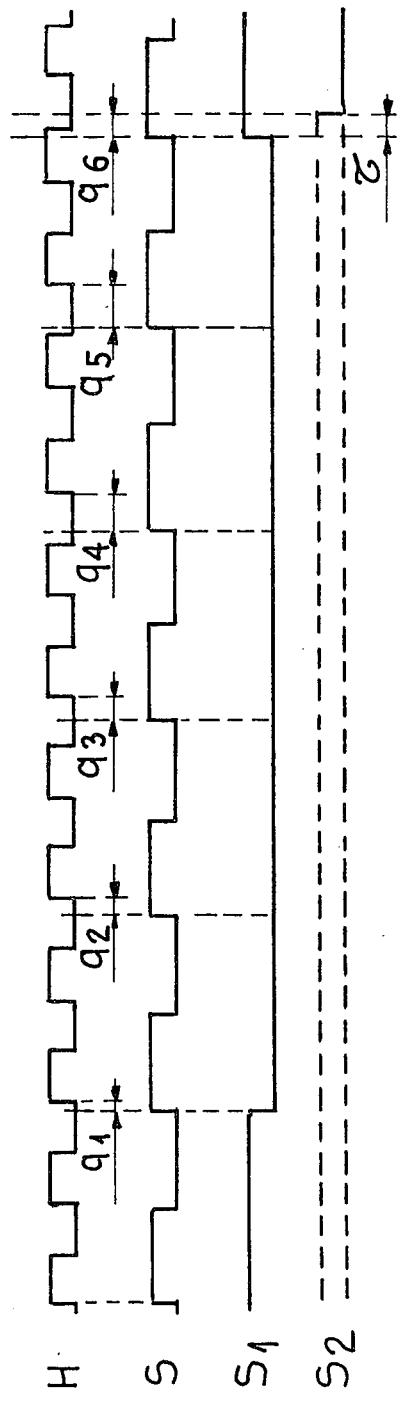

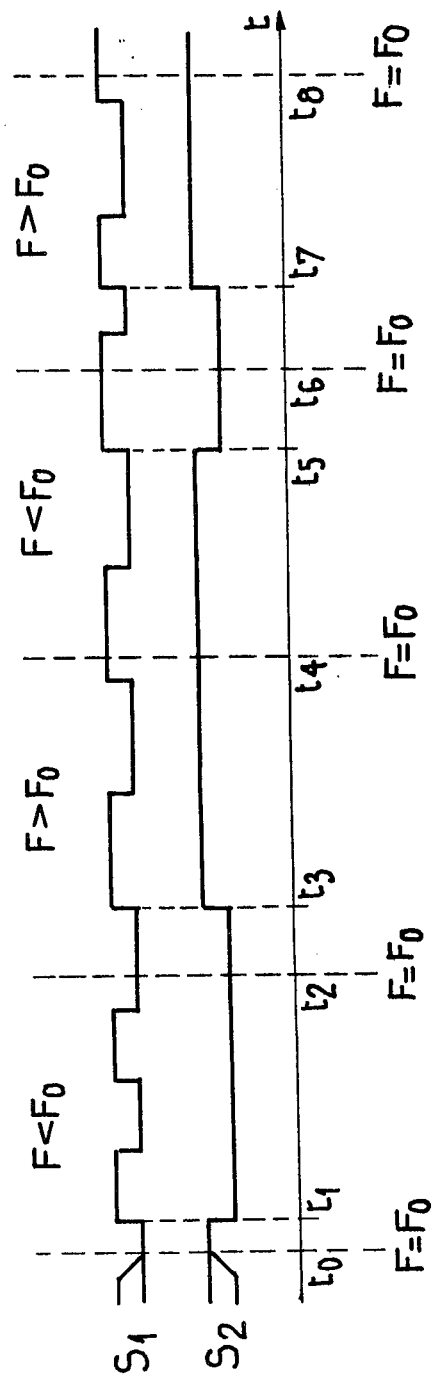

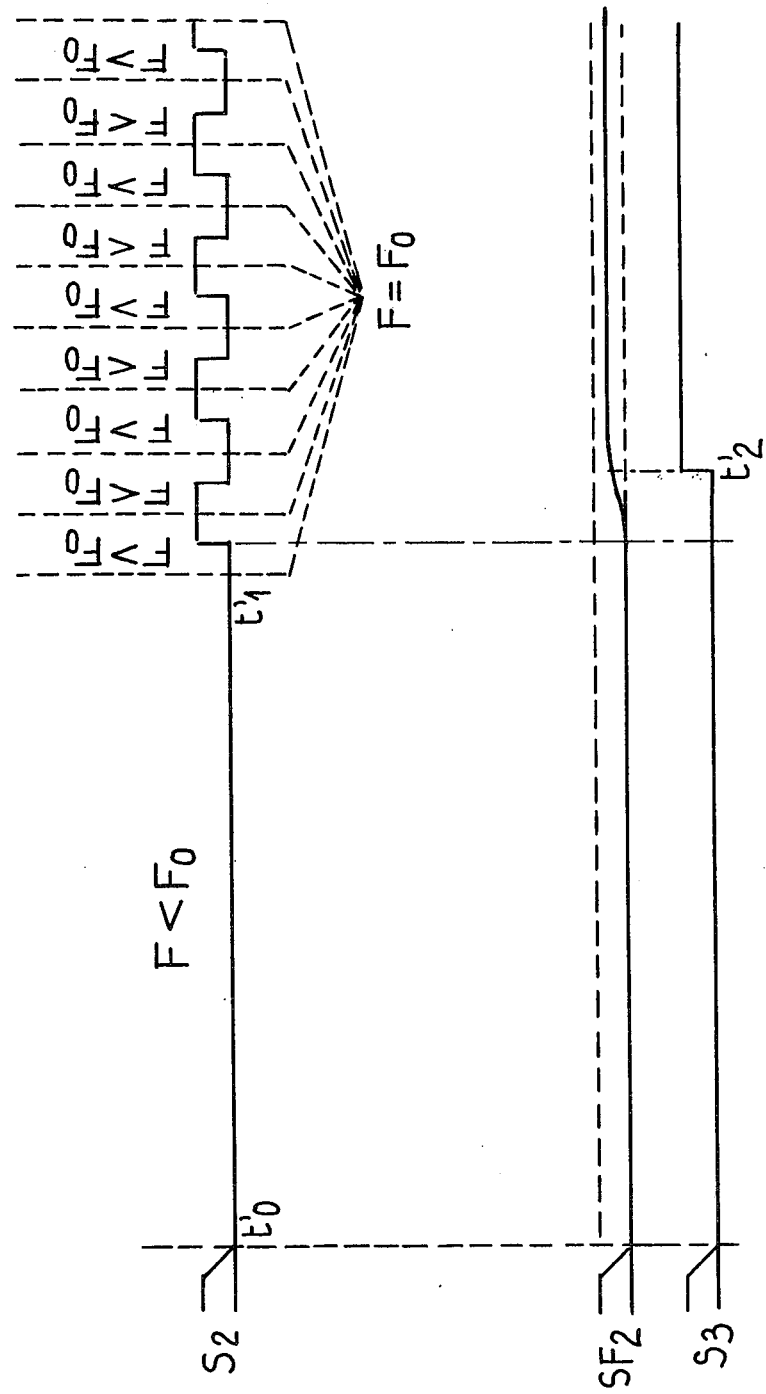
FIG_8

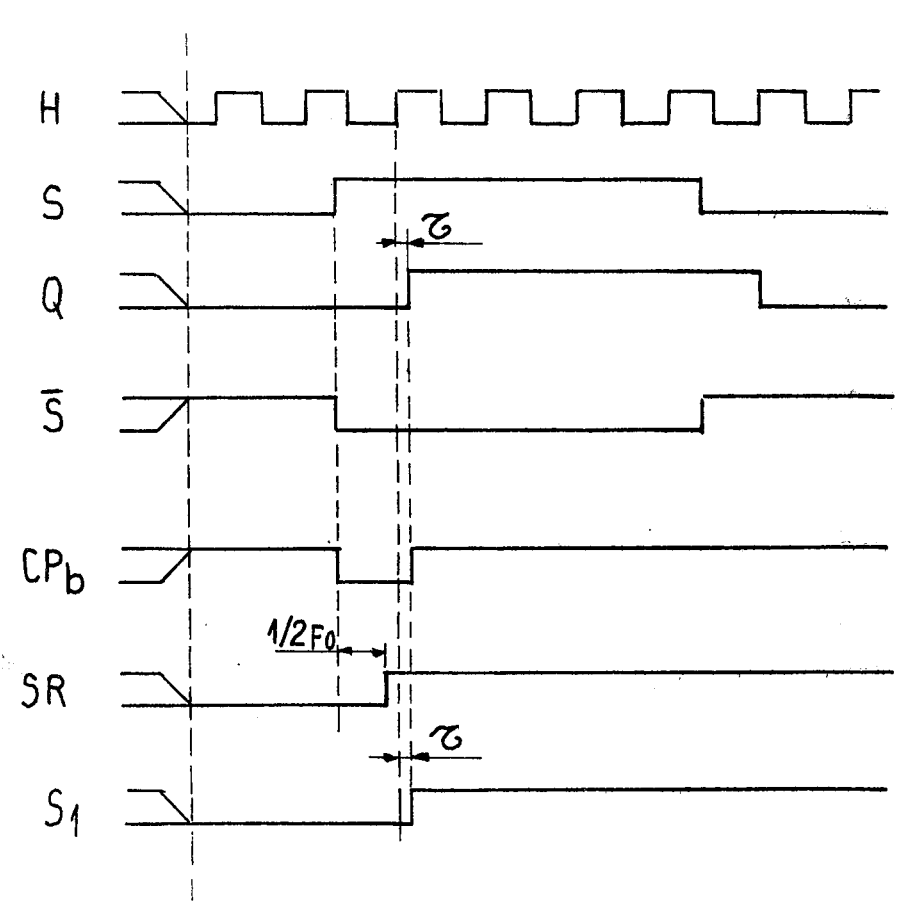
FIG_11

DEVICE FOR THE RECOVERY OF A CLOCK SIGNAL FROM A BINARY SIGNAL

This invention relates to devices for the recovery of a clock signal from a binary signal delivered by a binary data transmission system and in particular a system which utilizes a transmission channel of the video recorder type.

Transmission systems of this type entail the need to regenerate a local clock signal for restituting the rate of emitted binary data at the input of the transmission channel. Said local clock signal must be controlled in dependence on the emission clock signal both in frequency and in phase in order that the values of the emitted data may be suitably determined from the channel output signal. Irrespective of the mode of transmission adopted, the binary signal regenerated at the receiver undergoes signal transitions (from state 0 to state 1 and conversely) which are spaced by an integral multiple of the period of the emission clock signal and therefore of the local clock signal to be regenerated.

One well-known solution for the desired recovery of the local clock signal consists in detecting the transitions of the received binary signal and in dividing the frequency of a clock signal delivered by an oscillator which produces a frequency q times higher than the frequency of the desired local clock signal by means of a variable-divisor divider. The value of said variable divisor is controlled by means of a control signal delivered by a detector, the function of which is to detect the position of the transitions of the data signal with respect to the leading edge of the local clock signal obtained at the output of the divider, in order to vary the frequency and consequently the phase of said local clock signal.

However, this method is unsuitable when the frequency of the local clock signal to be recovered is very high since this would entail the use of an oscillator having a frequency of unduly high value. For example, this method is impracticable in the case of digital video recorder systems.

Another solution consists in making use of narrow-bandpass filters (of the quartz-crystal type) for extracting a local clock signal from the channel output signal, the frequency and phase of said local signal being those of the emission clock signal.

However, the practical application of narrow-band filtering methods is costly. It should be mentioned in addition that, especially in digital video recorders, certain channels generate parasitic modulations which affect signal transitions. For example, the binary signal transmitted by a video recorder is highly fluctuating. This signal is adversely affected by a phase modulation at a low frequency (of a few KHz) which does not permit the use of narrow-bandpass filters for recovery of the local clock signal.

A third solution described in British patent No. 1,103,520 consists in the use of an oscillator whose frequency can be voltage-controlled. Logical means produce a first and a second binary signal having a cyclic ratio which is a function respectively of the phase difference and of a frequency difference. The control voltage of the oscillator is produced by a tuning control circuit as a function of the first signal if the frequency difference is of low value and as a function of the second signal if the frequency difference is of high value. The logical means for generating these two binary signals comprise a large number of bistable circuits and gates, thus making it impossible to operate them at a high frequency. Furthermore, the oscillator operates at a frequency which is four times higher than the bit rate, thus introducing difficulties in regard to the constructional design of the oscillator when the bit rate is of a high order.

The primary aim of this invention is to provide a device for recovering a local clock signal from a binary signal, said device being capable of operating at high frequencies and being controlled both in frequency and in phase in order to follow the signal variations.

In accordance with the invention, the device for the recovery of a local clock signal H from a binary signal S comprises:

an oscillator circuit having a frequency-control input and an output for delivering the clock signal H;

first logical means having a first input for receiving the binary signal S, a second input for receiving the clock signal H and having an output for delivering a logical signal $S_1$ representing the sign of the phase difference between the signals S and H;

second logical means having a first input for receiving the signal $S_1$, a second input for receiving the clock signal H and having an output for delivering a logical signal $S_3$ representing the sign of the frequency difference between the signals S and H;

a switching circuit having a first and a second input for receiving respectively the signals $S_1$ and $S_3$, a control input and an output for delivering one of the signals $S_1$ or $S_3$ according to the signal applied to the control input;

a switching control circuit having an input for receiving the signal $S_3$ and an output connected to the control input of the switching circuit;

a tuning control circuit having an input coupled to the output of the switching circuit and an output coupled to the control input of the oscillator circuit for delivering a control voltage to the oscillator circuit.

Other features of the invention will be more apparent upon consideration of the following description and accompanying drawings, wherein:

FIG. 1 is a block diagram of the device according to the invention;

FIG. 2 is a circuit diagram showing one embodiment of the device according to the invention;

FIGS. 3, 4, 5, 6, 7, 8 and 11 are signal time diagrams which serve to gain a better understanding of the operation of the device according to the invention;

FIG. 9 illustrates another embodiment of the device according to the invention;

FIG. 10 illustrates an alternative embodiment of one of the elements of the device according to the invention.

Referring to the block diagram of FIG. 1, the device comprises voltage-controlled oscillator 5, the output of which is coupled to an output terminal 2 of the device and delivers the desired local clock signal H. The control voltage of the electronic tuning device of the oscillator 5 is obtained from the binary signal S which is recovered at the output of the transmission channel. Said signal S is constituted by a series of states of 1 and of 0 corresponding to the values of the emitted data. The time-duration of the states is an integral multiple of the period of the emission clock signal. All the leading edges and trailing edges of said binary signal S are therefore in phase with the leading edges and trailing edges of the emission clock signal.

As shown in FIG. 1, the tuning control voltage of the oscillator circuit 5 is generated by a tuning control circuit 8, the output of which is coupled to a control input of the oscillator circuit 5. The input of said control circuit 8 is connected to the output of a switching circuit 6, the first and second inputs of which are coupled respectively to the output of a first logic circuit 3 and to the output of a second logic circuit 4. The first logic circuit 3 has first and second inputs coupled respectively to an input terminal 1 for delivering the signal S and to the output of the oscillator circuit 5. The output of said first logic circuit 3 delivers a signal $S_1$, the state of which is a function of the phase difference between the binary signal S and the local clock signal H delivered by the oscillator circuit 5. The second logic circuit 4 is provided with first and second inputs coupled respectively to the output of the first logic circuit 3 and to the output of the oscillator circuit 5. The output of said second logic circuit 4 delivers a signal $S_3$, the state of which is a function of the frequency difference between the local clock signal H and the binary signal S.

The switching circuit 6 is controlled so as to apply either the signal $S_1$ or the signal $S_3$ to the input of the tuning control circuit 8. This switching control is carried out by means of a switching control circuit 7, the first and second outputs of which are coupled respectively to first and second control inputs of the switching circuit 6. The switching control circuit 7 further comprises first and second inputs coupled respectively to the output of the second logic circuit 4 and to the output of the tuning control circuit 8.

The principle of operation of the device which has just been described will be more readily understood with the aid of the time diagrams shown in FIGS. 3, 4, 5, 6, 7 and 8.

The time diagrams of FIGS. 3 and 4 represent the three signals H, S and $S_1$.

The signal H corresponds to the local clock signal delivered by the device in accordance with the invention. The signal S corresponds to the binary signal received at the output of the transmission channel. In regard to the signal $S_1$, this signal corresponds to the phase information between the signals H and S or in other words to the signal delivered by the logic circuit 3.

In these two figures, the frequency F of the signal H is considered equal to the frequency $F_0$ of the desired local clock signal ($F_0$ therefore corresponds to the emission clock-signal frequency). Furthermore, in order to gain a more complete understanding of the figures, the signal S is shown in the case in which it is constituted alternately by a series of states 1 and 0 having a time-duration equal to a period $1/F_0$ of the desired local clock signal. This representation of the signal S will also be employed in FIGS. 4, 5, 6, 7 and 8 described hereinafter. It is worthy of note that, at the time of transmission of any sequence of data, the waveform of the binary signal will not be as uniform as that shown in the drawings. However, the signal transitions will always take place at instants which are spaced by an integral multiple of the period of the emission clock signal, that is, of the desired local clock signal, with the result that the explanations given hereunder will remain valid.

To consider that the frequency F of the signal H is equal to $F_0$ is virtually to consider that the relative movement of the signal S with respect to the signal H is zero. An item of phase information between the signals H and S can readily be obtained by memorizing the state of the signal H at each leading edge of the signal S (or, equivalently, at each trailing edge).

In fact, if the signal H lags with respect to the signal S as is the case in FIG. 3, the state of the signal H at each leading edge of the signal S is in the logical state 0. The signal $S_1$ representing the phase information between the signals H and S is consequently in state 0.

If the signal H leads with respect to the signal S as shown in FIG. 4, the state of the signal H at each leading edge of the signal S is the logical state 1. From this it follows that the signal $S_1$ is in the logical state 1 in the second case just mentioned.

This phase information is delivered by the first logic circuit 3 and can be employed for carrying out phase-locking of the signal H with respect to the signal S. To this end, it is only necessary to control the oscillator circuit 5 with the signal $S_1$ in such a manner as to ensure that the frequency of the oscillator circuit 5 rises when said signal $S_1$ is in the logical state 0 and falls when $S_1$ is in the logical state 1. This results in locking of the leading edges of the signal H to the leading edges of the signal S. Assuming reverse conditions, locking takes place on the trailing edges of the signal H.

Follow-up control of the oscillator circuit 5 can be carried out by this phase information alone on condition that the oscillator frequency F is very close to the desired local clock signal frequency $F_0$.

When F is different from $F_0$, the relative movement of the signal S with respect to the signal H is no longer zero and the phase information which is deduced in the same manner as before changes continuously as a function of drift of the signal H with respect to the signal S.

A time diagram or so-called waveform diagram of the signals H, S, $S_1$ and $S_2$ is shown in each of FIGS. 5 and 6.

FIG. 5 corresponds to the case in which the frequency F of the clock signal H delivered by the oscillator circuit 5 is higher than the frequency of the desired local clock signal (F>$F_0$). In the example considered, the signal S corresponds to a series of bits having the values 0 and 1 in alternate succession. The first leading edge of the signal S is synchronous with a leading edge of the signal H. The second leading edge of the signal S has a time-delay $r_1$ with respect to the leading edge of the signal H which should be synchronous with this latter. The following leading edges of the signal S have time-delays $r_2$, $r_3$, $r_4$, $r_5$, $r_6$ which are of increasing value. The second, third, fourth and fifth leading edges of the signal S initiate storage of the value H=1 which constitutes the signal $S_1$. By reason of the fact that the time-delay $r_5$ is longer than one clock half-period, the second leading edge of the signal S initiates storage of the value H=0 in order to constitute the new value of $S_1$. Since the value of the time-delay continues to increase, it then attains and exceeds one period, whereupon the signal $S_1$ reverts to the value H=1. Since the difference between the frequency of the signal H and the recurrence rate of the signal S is of small value, the time-delays $r_1$, $r_2$, and so forth, increase in small steps. The transition of the signal $S_1$ to the level 1 therefore takes place shortly after a leading edge of the signal H and the transition to the level 0 takes place shortly after a trailing edge of the signal H.

FIG. 6 corresponds to the case in which F is of lower value than $F_0$.

In this example, the leading edges of the signal S have an increasing lead with respect to the leading edges of the signal H. ($a_1$, $a_2$, etc.). The second leading edge of the signal S has a lead $a_1$ with respect to the leading edge of the signal H which should be synchronous with this latter and therefore initiates storage of the value $H=0$ in order to form the signal $S_1$. The second, third, fourth, fifth and sixth leading edges of the signal S initiate storage of the same value $H=0$. Inasmuch as the lead $a_6$ of the sixth leading edge of the signal S is slightly longer than one half-period, said leading edge initiates storage of a value $H=1$ in order to form the signal $S_1$. Inasmuch as the value of the lead increases in a small step, transition of the signal $S_1$ to the level 1 takes place shortly before a trailing edge of the signal H.

In order to determine whether $F<F_0$ or $F>F_0$ it is therefore only necessary to detect whether the leading edge of the signal $S_1$ is either preceded by a leading edge of the signal H or followed by a trailing edge. This discrimination is carried out by storing the state of the signal H after each leading edge of the signal $S_1$ with a time-delay $\tau$ ($\tau<<1/F$). The signal obtained is designated as $S_2$ in FIGS. 5 and 6. If a leading edge of the signal H precedes a leading edge of the signal $S_1$, then $S_2$ changes to the level 1 (as shown in FIG. 5). Should a trailing edge of the signal H follow a leading edge of the signal $S_1$ before the end of the time-delay $\tau$, the signal $S_2$ accordingly changes to the level 0 (as shown in FIG. 6). In this example of construction, the time-delay $\tau$ is constituted by the transit time of the logical signal $S_1$ through a bistable circuit. The range of capture of the frequency control device is broader as the time-delay $\tau$ is shorter. It is equivalent practice to make use of the trailing edges and it is even possible to employ the leading edges and trailing edges in order to obtain a maximum amount of information. It is apparent that the state of the signal $S_2$ is 1 in the event that F is higher in value than $F_0$ (FIG. 5) and that the state of the signal $S_2$ is 0 in the event that F is lower in value than $F_0$ (FIG. 6). This signal $S_2$ can be considered as an item of frequency information and is capable of controlling the oscillator circuit 5.

When this item of frequency information controls the oscillator circuit 5, the frequency F of the output signal of this latter oscillates on each side of the value $F_0$ and the state of the signal $S_2$ changes continuously, for example as indicated in the diagram of the signals $S_1$ and $S_2$ shown in FIG. 7.

The signals $S_1$ and $S_2$ shown in this diagram start from an instant $t_0$. Between the instants $t_0$ and $t_2$ and between the instants $t_4$ and $t_6$, the frequency F of the signal H is lower than $F_0$. Between the instants $t_2$ and $t_4$ and between the instants $t_6$ and $t_8$, the frequency F is higher than $F_0$. At the instants $t_0$, $t_2$, $t_4$, $t_6$ and $t_8$, F is equal to $F_0$.

In this figure, it is apparent that control of the oscillator circuit 5 by the signal $S_2$ is insufficient. In fact, the changes of state of the signal $S_2$ (instants $t_1$, $t_3$, $t_5$ and $t_7$) do not take place at the instants at which F is equal to $F_0$. The system exhibits hysteresis. Drift of the signal H with respect to the signal S (which may attain one half-period of the emission clock signal) must necessarily have taken place before the signal $S_2$ changes state and thus indicates that F is equal to $F_0$. In this example as shown in FIG. 6, a time interval equal to twelve clock periods elapses before the signal $S_2$ indicates that F is lower than $F_0$.

In order to carry out suitable control of electronic tuning of the oscillator circuit 5, it is necessary to combine the phase information (signal $S_1$) and the frequency information (signal $S_2$). This entails the need to control the oscillator circuit 5 with the phase information when F is very close to $F_0$ and with the frequency information when F is either considerably lower or considerably higher than $F_0$. To this end, the switching control circuit 7 operates the switching circuit 6 so that this latter should deliver to the input of the tuning control circuit 8 either the signal $S_1$ or the signal $S_3$ associated with the signal $S_2$ as indicated in FIG. 8.

In this figure, there is shown a time diagram of the signals $S_2$, $SF_2$ and $S_3$.

The waveform of the signal $S_2$ corresponds to the case in which the signal $S_2$ is used for controlling the oscillator circuit 5. Between the instants $t'_0$ and $t'_1$, the frequency F of the signal H is considered to be lower than $F_0$. After the instant $t'_1$, the frequency F oscillates on each side of the frequency $F_0$ and the state of the signal $S_2$ changes continuously.

The signal $SF_2$ corresponds to the signal $S_2$ after filtering of this latter. In regard to the signal $S_3$, it corresponds to logical shaping of the signal $SF_2$. Filtering of the signal $S_2$ serves on the one hand to remove parasitic data which impair the signal $S_2$ and on the other hand to permit easy detection of the zone in which F oscillates on each side of $F_0$ or in other words the zone in which F is close in value to $F_0$. The value of the signal $SF_2$ is compared with a fixed threshold having an intermediate value between the values corresponding to the logical levels 0 and 1. When F is considerably lower than $F_0$, the signal $S_3$ has a stable level 0. When F is considerably higher than $F_0$, the signal $S_3$ has a stable level 1. When F comes close in value to $F_0$ and then oscillates on each side of $F_0$, the value of the voltage of the signal $SF_2$ varies with respect to the intermediate value and the signal $S_3$ accordingly undergoes transitions. The signal $S_3$ therefore represents two items of frequency information:

if said signal has a stable level, its value represents the sign of the frequency difference;

if said signal undergoes a change of level, this represents a transition of the frequency F through the value $F_0$.

The first item of information serves to initiate either an increase or a decrease in the oscillator frequency.

The second item of information serves to determine the instant at which the phase control must take over from the frequency control.

In accordance with the basic principle of the invention, the aforementioned signal $S_3$ generated by the second logic circuit 4 is used by the control circuit 7 for controlling the switching circuit 6. This control operation is carried out with a view to ensuring that the switching circuit 6 applies the signal $S_3$ to the input of the tuning control circuit 8 as long as the state of said signal $S_3$ remains stable either at the level 0 or at the level 1. As soon as the state of said signal $S_3$ changes, the switching circuit 6 applies the signal $S_1$ to the input of the tuning control circuit 8. Thus said circuit 8 delivers a control voltage for electronic tuning of the oscillator circuit 5 which is a function of the frequency information (signal $S_3$) when the frequency F is considerably higher than or lower than the frequency $F_0$ and is then a function of the phase information (signal $S_1$) as soon as F is close in value to $F_0$.

Conversely, in the event that the control voltage is a function of the phase information and that the frequency F again becomes considerably lower than or higher than the frequency $F_0$, the switching control circuit 7 is so designed as to be capable of controlling the switching circuit 6 in such a manner as to ensure that this latter again delivers the signal $S_3$ or in other words that the oscillator circuit 5 is again controlled by the frequency information. This switching control operation is carried out when the tuning control voltage of the oscillator circuit 5 (which is present at the second input of the circuit 7) is either lower than $V_0-0.7V$ ($V_0$ being the control voltage when the frequency F is equal to the frequency $F_0$) or higher than $V_0+0.7V$, which means that the value of F is no longer very close to $F_0$.

FIG. 2 shows one embodiment of the device according to the invention in which the principle explained in the foregoing is applied in practice.

The circuits indicated in the block diagram of FIG. 1 are again shown in FIG. 2. In this case, however, the circuit components are illustrated in detail.

It should further be noted that the resistors which do not bear references correspond to load resistors which must necessarily be placed at the output of the emitter-coupled logic elements (which will hereinafter be designated as ECL elements) and that the coupling of two outputs of the ECL elements carries out a logical OR function.

In this embodiment of the device, the first logic circuit 3 is a bistable device of the so-called D type. In a so-called D-type bistable device, the level of the output signal assumes the value of the input signal at each appearance of a leading edge of the clock signal applied to the clock input of the bistable device.

The D input of said bistable device 3 is coupled to the terminal 1 which is intended to receive the binary signal S. The clock input CK of said circuit is connected to the output terminal 2 which is intended to deliver the desired local clock signal H. The output Q of the bistable device 3 delivers the phase information signal $S_1$ as defined earlier.

The second logic circuit 4 is mainly composed of a D-type bistable device 9. This bistable device 9 has a D input connected to the output of the bistable device 3, a clock input CK connected to the output terminal 2 and an output Q which delivers the signal $S_2$ as defined earlier. The circuit 4 further comprises a resistor $R_1$, the first end of which is connected to the output of the bistable device 9, and a capacitor $C_1$ which couples the second end of the resistor $R_1$ to ground. Said resistor $R_1$ and said capacitor $C_1$ provide a filter for filtering the signal $S_2$ and for delivering the signal $SF_2$ (as shown in FIG. 8).

The second end of the resistor $R_1$ is then connected to a first input of a first ECL line receiver 10, the output and the second complemented input of which are connected respectively to the first complemented input and to the second input of a second ECL line receiver 11. The second complemented input of the line receiver 10 is also connected to an output 50 of the line receiver 11 which is intended to deliver one-half of the sum of values present on each of the inputs of the line receiver 11. These two line receivers which form part of the circuit 4 serve to generate the frequency information signal $S_3$ as defined earlier on the complemented ouput of the line receiver 11 (as shown in FIG. 8).

The switching circuit 6 is formed by means of two AND-gates 12 and 13.

The first and second inputs of the AND-gate 12 are coupled respectively to the output of the bistable device 3 and to the first output of the switching control circuit 7. The first and second inputs of the AND-gate 13 are coupled respectively to the complemented output of the second line receiver 11 and to the second output of the switching control circuit 7.

Said switching control circuit 7 is mainly formed by means of a D-type bistable device 14. The outputs Q and $\overline{Q}$ of said bistable device 14 correspond respectively to the first and second outputs of the switching control circuit 7. Said outputs therefore make it possible to control the gates 12 and 13 respectively.

The D input of the bistable device 14 is connected to a potential source V. In regard to the clock input CK of said bistable device 14, said input is coupled to the output of an exclusive-OR gate 53, the first and second inputs of which are connected respectively to the complemented output of the line receiver 11 and to the output of an exclusive-OR gate 52. The first and second inputs of said exclusive-OR gate 52 are connected respectively to the output of an exclusive-OR gate 51 and to the potential source V. The first and second inputs of the exclusive-OR gate 51 are connected respectively to the complemented output of the line receiver 11 and to the potential source V.

This circuit arrangement composed of exclusive-OR gates serves to generate a leading edge on the clock input CK of the bistable device 14 as soon as a leading edge or a trailing edge appears on the signals $S_3$. In fact, the exclusive-OR gates 51 and 52 serve only to delay the signal $S_3$ to a slight extent, with the result that the exclusive-OR gate 53, the first and second inputs of which receive the signal $S_3$ and the delayed signal $S_3$ respectively, triggers the bistable device 14 each time a leading edge or trailing edge appears on the signal $S_3$. The outputs Q and $\overline{Q}$ of the bistable device 14 remain in state 0 and state 1 respectively as long as a pulse does not arrive at the reset-to-1 input $S'$.

In accordance with the principle set forth in the foregoing, said bistable device 14 therefore serves to activate the AND-gates 12 and 13 in order to ensure that the input of the tuning control circuit 8 which is coupled to the output of the gate 12 and to the output of the AND-gate 13 receives the signal $S_3$ when the frequency F of the signal H is considerably lower than or considerably higher than the frequency $F_0$ and receives the signal $S_1$ when said frequency F is close in value to $F_0$.

Starting from said signals $S_1$ and $S_3$ and converse signals, the tuning control circuit 8 generates the electronic tuning control voltage of the oscillator circuit 5.

To this end, the tuning control circuit 8 comprises an AND-gate 60 which delivers either the signal $S_1$ and converse signal or the signal $S_3$ and converse signal, and an amplifying circuit constituted by amplifiers 18, 19 and 20 mounted as a differential amplifier.

The first and second inputs of the AND-gate 60 are connected respectively to the output of the switching circuit 6 and to ground. One output of said AND-gate 60 is coupled to the input "−" of the operational amplifier 19 through a resistor $R_2$ and to the input "+" of the operational amplifier 18 through a resistor $R_6$. The input "−" of the amplifier 18 is coupled to the complemented output of the AND-gate 60 through a resistor $R_7$ and to the output of the amplifier 18 through a resistor $R_8$. The output "+" of said amplifier 18 is also coupled to ground through a resistor $R_9$. The input "+" of the amplifier 19 is coupled to a complemented output of the AND-gate 60 through a resistor $R_4$ and to ground through a resistor $R_5$. Moreover, the input "−" of said amplifier 19 is coupled to its output through a resistor $R_3$.

The output of the amplifier 18 is coupled to the input "−" of the amplifier 20 through a resistor $R_{10}$. The input "−" of said amplifier 20 is also coupled to its output through a resistor $R_{12}$. The input "+" of the amplifier 20 is coupled to the output of the amplifier 19 through the resistor $R_{11}$ and to ground through a resistor $R_{13}$ and a capacitor $C_2$ which are mounted in parallel. In addition, the output of the amplifier 20 is coupled to the input of the oscillator circuit 5.

The amplifying circuit thus constituted serves to generate the tuning control voltage of the oscillator circuit 5 by averaging the phase information signal $S_1$ or the frequency information signal $S_3$. The elements of said amplifying circuit are chosen so as to ensure that the gain of the circuit is high at low frequency and low at high frequency. To this end, the amplifier 18 and the resistors $R_6$, $R_7$, $R_8$ and $R_9$ constitute a first amplifying channel having low gain and a wide passband; the amplifier 19 and the resistors $R_2$, $R_3$, $R_4$ and $R_5$, $R_{11}$, $R_{13}$ and the capacitor $C_2$ constitute a second amplifying channel having a high gain and a narrow passband; the amplifier 20 and the resistors $R_{10}$, $R_{12}$, $R_{13}$ constitute a summing device for adding the signals delivered by the two amplifying channels. In the case of a binary signal S delivered by a video recorder, the frequency variations arise from thermal drift, mechanical variations and the like which are slow variations but have a wide range of amplitude. These variations are compensated by the signal delivered by the second amplifying channel. Furthermore, very rapid phase variations take place during the switching operations of the rotary magnetic heads for which, on the contrary, a correction of small amplitude is sufficient. These variations are compensated by the signal delivered by the first amplifying channel.

The voltage-controlled oscillator circuit 5 comprises an oscillator 51 and an electronic tuning device consisting of two resistors $R_{14}$ and $R_{15}$, a diode $D_3$, two variable-capacitance diodes $D_4$ and $D_5$, an inductance coil L and a capacitor $C_4$.

The first and second ends of the resistor $R_{14}$ are connected respectively to the output of the amplifier 20 and to the anode of the diode $D_3$, the cathode of which is connected to ground. The anode of the diode $D_3$ is also connected to the first end of the resistor $R_{15}$, the second end of which is connected to the cathode of the diode $D_4$ and to the cathode of the diode $D_5$. The anode of the diode $D_4$ is connected to a first input of the oscillator 51. The anode of the diode $D_4$ is connected to a second input of the oscillator 51. The inductance coil L and the capacitor C are mounted in parallel between the first and second inputs of the oscillator 51. The capacitor $C_4$ couples the second input of the oscillator 51 to ground.

The value of the inductance L and the value of the capacitance C are such that the oscillation frequency is $F_0$ when the value of the control voltage generated by the circuit 8 is $V_0$. An increase or a decrease in the control voltage produces a variation in capacitance of the diodes $D_4$ and $D_5$. This variation results in detuning of the circuit consisting of the inductance coil L and the capacitor C, thus giving rise to a variation in frequency of the output signal of the oscillator 51. In consequence, this signal is controlled both in frequency and in phase in dependence on the emission clock signal and can be employed for determining the values of the transmitted data.

Once the system has been phase-locked, it must be ensured that the circuit 6 can again be controlled by the switching control circuit 8 and again be capable of delivering the signal $S_3$ in the event that the frequency F of the signal delivered by the oscillator 51 becomes considerably lower than or considerably higher than the desired frequency $F_0$ To this end, the circuit 7 comprises means for comparing the value of the control voltage with respect to $V_0-0.7V$ and $V_0+0.7V$. When the control voltage is higher than $V_0+0.7V$ or lower than $V_0-0.7V$, these comparison means generate a control signal for one-resetting the output Q of the bistable device 14, thus having the effect of controlling the switching circuit 6 so as to enable this latter once again to deliver the frequency information signal $S_3$ to the input of the circuit 8.

In the embodiment described in FIG. 2, the comparison means have been formed by means of two comparators 16 and 17. The input "−" of the comparator 16 and the input "+" of the comparator 17 are connected to the output of the circuit 8. The input "+" of the comparator 16 is coupled to a potential source V' through a resistor $R_{17}$ and to the anode of a diode $D_1$, the cathode of which is connected to ground. Similarly, the input "−" of the comparator 17 is coupled to the potential source V' through a resistor $R_{18}$ and to the anode of a diode $D_2$, the cathode of which is connected to ground. The output of the comparator 16 and the output of the comparator 17 are coupled to the potential source V' through a resistor $R_{16}$ and to the input of a level converter 15, the output of which is connected to an input S' of the bistable device 14.

In this embodiment, the value $V_0$ is assumed to be equal to zero. Thus the comparators 16 and 17 compare respectively the control voltage with the values $-0.7V$ and $+0.7V$. When this control voltage is lower than $-0.7V$ or higher than $+0.7V$, the comparator 18 or the comparator 17 deliver a control signal through the TTL-ECL level converter 15 (transistor-transistor logic/emitter-coupled logic converter). Said control signal serves to reset the output Q of the bistable device to 1 and is applied to the input S' of said bistable device (14).

It is worthy of note that the device for the recovery of a clock signal as described in the foregoing is based solely on the transitions of the binary signal S which is present at the output of the transmission channel and does not entail the need for any particular synchronization sequence. The device continues to operate even when no transition takes place. However, a prolonged absence of transitions results in drift of the oscillator. One improvement consists in detecting the absence of transition by means of a retriggerable monostable circuit and in blocking the control voltage of the oscillator circuit when such an absence is detected. This principle can readily be applied by means of the structure illustrated in FIG. 9.

This figure again shows the recovery device in accordance with the invention as described with reference to FIG. 1. In this instance, however, the output of the tuning control circuit 8 is not connected directly to the input of the oscillator circuit 5.

In fact, the output of the control circuit 8 is coupled to the input of the oscillator circuit 5 through the channel of a field-effect transistor 72 and an amplifier 73. A capacitor C', the ends of which are connected respectively to the input of the amplifier 73 and to ground is used for storing the value of the control voltage of the oscillator circuit 5. In regard to the operational amplifier 73, this amplifier is inserted between the transistor 72 and the oscillator circuit 5 and serves as an impedance matching device.

A monostable device 71, the input of which is coupled to the terminal 1, is triggered by the transitions of the signal S. The output of the monostable device 71 is coupled to the gate input of the transistor 72, with the result that said transistor 72 remains in the conducting state as long as the monostable device is triggered. As soon as the signal S no longer undergoes any transitions for triggering the monostable device 71, the transistor 72 is caused to cut-off. The control voltage delivered to the oscillator circuit 5 is then the voltage stored by the capacitor C' as long as no transition is present on the terminal 1.

The invention is not limited to the embodiment described with reference to the accompanying drawings. In particular, it is within the capacity of anyone versed in the art to construct a device by means of circuits of TTL type when this is permitted by the operating frequency.

It is also within the capacity of those skilled in the art to devise different methods for extracting the phase information and frequency information signals of the type described in the foregoing.

By way of example, the phase information signal can be obtained by recording the state of the signal S delayed by one half-period $1/(2F_0)$ at the instant of appearance of the first leading edge of the local clock signal H which follows the leading edges of the binary signal S (an equivalent result can be obtained by employing the trailing edges). The structure shown in FIG. 10 permits the practical application of this extraction principle.

There are shown in this figure an ECL line receiver 64, two D-type bistable devices 62 and 63, and a delay device 61.

The input D and the output Q of the bistable device 62 are connected respectively to the output 64 and to the complemented output 65 of the line receiver 60, the input of which is connected to the terminal 1. The clock input $\overline{CE_1}$ of the bistable device 62 and the clock input $CP_a$ of the bistable device 63 are connected to the output terminal 2 of the recovery device in accordance with the invention. The output Q of the bistable device 62 and the complemented output 65 of the line receiver 60 are connected so as to constitute a wired OR-gate which supplies the auxiliary input $CP_b$ of the bistable device 63. The output 64 is also coupled to the input $D_0$ of the bistable device 63 through the delay device 61 which has a time-delay $1/(2F_0)$. The output $Q_0$ of the bistable device 63 is connected to the terminal 70 which corresponds to the output of the first logic circuit 3 (as shown in FIG. 1).

The operation of this variant of the logic circuit 3 will be more readily understood by reference to the time diagram shown in FIG. 11.

In this figure, there are shown the signals H, S, Q, $\overline{S}$, $CO_b$, SR and $S_1$ which are present respectively at the terminal 2, at the input D of the bistable device 62, at the output Q of the bistable device 62, at the output 65 of the line receiver 60, at the input $CP_b$ of the bistable device 63, at the input $D_0$ of the bistable device 63 and at the output $Q_0$ of the bistable device 63.

The bistable devices 62 and 63 are of the D type. The output Q of the bistable device 62 therefore delivers the signal Q whose state corresponds to that of the signal S at each instant at which it appears at the leading edge of the signal H. By coupling the input $CP_b$ to the output Q of the bistable device 62 and to the complemented output 65 of the line receiver 60, there is thus performed a logical OR operation between the signals Q and $\overline{S}$. In regard to the signal which is present at the output $Q_0$ of the bistable device 63, said signal is formed by taking the state of the delayed signal SR at each leading edge of the signal H which is present at the input $CP_a$ of the bistable device 63 on condition that the signal $CP_b$ is in state 0 or in other words that a leading edge of the signal S has previously been detected.

This output signal of the bistable device 63 can then be used as a phase information signal $S_1$.

What is claimed is:

1. A device for the recovery of a local clock signal H from a binary signal S, comprising:
    an oscillator circuit having a frequency-control input and an output for delivering the clock signal H;
    first logical means having a first input for receiving the binary signal S, a second input for receiving the clock signal H and having an output for delivering a logical signal $S_1$ representing the sign of the phase difference between the signals S and H;
    second logical means having a first input for receiving the signal $S_1$ from said first logical means output, a second input for receiving the clock signal H and having an output for delivering a logical signal $S_3$ representing the sign of the frequency difference between the signals S and H;
    a switching circuit having a first and a second input for receiving respectively the signals $S_1$ and $S_3$ from the outputs of said first and second logical means, a control input and an output for delivering one of the signals $S_1$ or $S_3$ according to the signal applied to the control input;
    a switching control circuit having a first input for receiving the signal $S_3$ from said second logical means, a second input and an output connected to the control input of the switching circuit;
    a tuning control circuit having an input coupled to the output of the switching circuit and an output coupled to the second input of said switching control circuit and also to the control input of the oscillator circuit for delivering a control voltage to the oscillator circuit.

2. A device according to claim 1, wherein the first logical means comprise a bistable device having a clock input for receiving the signal S, an input coupled to the output of the oscillator circuit, and an output for delivering the signal $S_1$.

3. A device according to claim 1, wherein the second logical means comprise:
    a bistable device having a clock input coupled to the output of the first logical means, an input for receiving the clock signal H, and an output for delivering a logical signal $S_2$;
    a filter for filtering the signal $S_2$ and delivering signal $SF_2$;
    a shaping circuit for putting the signal $SF_2$ in logical form and delivering the logical signal $S_3$.

4. A device according to claim 1, wherein the switching control circuit comprises a bistable device having a clock input coupled to the output of the second logical means and an output coupled to the control input of the switching circuit.

5. A device according to claim 1, wherein the switching control comprises comparison means having a first input for receiving the control voltage of the oscillator circuit and a second input for receiving a voltage having a fixed value S'', and having an output coupled to the control input of the switching circuit for controlling and causing said switching circuit to deliver the signal $S_3$ when the absolute value of the control voltage is higher than $S''$.

6. A device according to claim 1, wherein the first logical means comprise:
    means for detecting the transition from state X to state $\overline{X}$ of the signal H which immediately follows a transition from state X to state $\overline{X}$ of the signal S, having a first and a second input for receiving respectively the signal H and the signal S, and an output;
    a delay device having a time-delay equal to one half-period of the clock signal H, having an input for receiving the signal S and having an output for delivering the delayed signal S;
    logical means having a first input coupled to the output of the detection means, a second and a third input for receiving respectively the delayed signal S and the signal H, and an output for generating the logical signal $S_1$ by storing the state of the delayed signal S at the instant at which a transition of the signal H from state X to state $\overline{X}$ is detected by the detection means.

7. A device according to claim 1 comprising:
    coupling means having a control input, an input connected to the output of the tuning control circuit and an output coupled to the control input of the oscillator circuit;
    means for storing the control voltage of the oscillator circuit, having an input coupled to the output of the coupling means and an output coupled to the control input of the oscillator circuit in order to deliver a stored control voltage when the coupling means interrupt the connection between the output of the tuning control circuit and the control input of the oscillator circuit;
    means for detecting the absence of change of state of the binary signal S, having an input for receiving the signal S and an output coupled to the control input of the coupling means.

* * * * *